July 12, 1938. R. J. BUETTNER ET AL Re. 20,791

SELF CLOSING COMBINATION LOCK

Original Filed June 23, 1930

Inventors.
Raymond J. Buettner;
Robert A. Found; Joseph M. Muntre;
John J. Neitz; Frank Zanzig.
by Burton & Burton
their Attorneys.

Reissued July 12, 1938

Re. 20,791

UNITED STATES PATENT OFFICE 20,791

SELF-CLOSING COMBINATION LOCK

Raymond J. Buettner and Robert A. Found, West Allis, Wis., Joseph M. Muntner, Chicago, and John J. Neitz, Naperville, Ill., and Frank C. Zanzig, Milwaukee, Wis., assignors to Dudley Lock Corporation, Chicago, Ill., a corporation of Illinois Original No. 1,902,214, dated March 21, 1933, Serial No. 463,018, June 23, 1930. Application for reissue May 31, 1934, Serial No. 728,448

23 Claims. (Cl. 70—25)

This invention relates to permutation locks, and more particularly to permutation padlocks of the type having a shackle, one end of which is adapted to be releasably secured in the casing. The main object of the present invention is to provide an improved and simplified construction wherein the releasable end of the shackle is adapted to be automatically locked in the casing upon its entry therein. Another object resides in the provision of means for automatically upsetting the tumbler combination upon entry of said releasable end of the shackle therein, and thereby simultaneously locking said end of the shackle in the casing. A further object is to provide an improved lock structure having means adapted to normally close the opening in the casing through which the releasable end of the shackle enters, when said end of the shackle is out of the casing. It consists in certain features and elements of construction, in combination, as herein shown and described, and as indicated by the claims.

Figure 3:
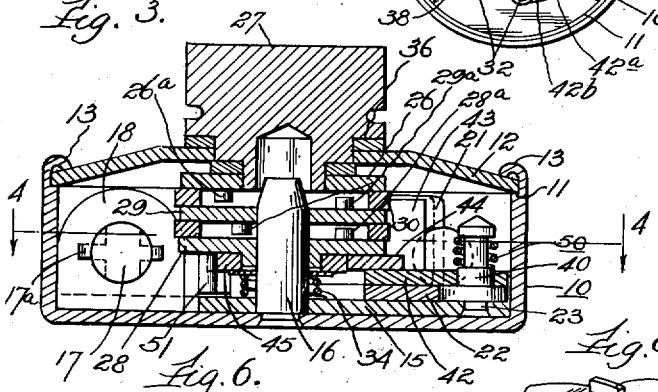
Figure 3 is an axial sectional view through the lock.
Figure 6:
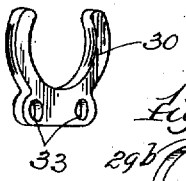
Figure 6 is a perspective view of a tumbler spacing element.
Figure 8:
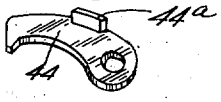
Figure 8 is a perspective view of the ratchet pawl.
Figure 7:
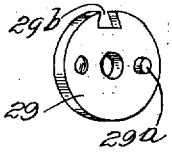
Figure 7 is a perspective view of the intermediate tumbler.

The padlock, as illustrated in the drawing, includes an annular cup-shaped shell or casing, 10, having its upper open edge formed with a shoulder, 11, against which is seated a cover plate, 12, and which is firmly held in position against said shoulder by spinning over the edges of said shell, as indicated at 13. Disposed in said cup-shaped casing part is a mounting plate, 15, which carries a centrally located stud, 16, which, as may be seen in Figure 3, is firmly secured to the bottom of the lock casing, 10.

Figure 10:
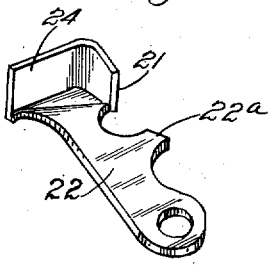
Figure 10 is a perspective view of the locking pawl.

A U-shaped shackle, 17, has one leg slidably and rotatably mounted in an upstanding lug, 18, of the mounting plate, 15, and has its extreme end deformed, as at 17a, so as to anchor said shackle against complete removal from the casing while permitting a limited range of reciprocatory movement relative thereto. The opposite leg of the shackle is somewhat shorter and is provided with an obliquely disposed inwardly facing notch, 20, which is adapted to be positioned within the wall of the cup-shaped casing and engaged by a locking flange, 21, of the locking pawl, 22, which is pivoted at 23, to the mounting plate, adjacent the wall of the casing. The locking pawl, as may be seen in Figure 10, is shown in the nature of a metal stamping, and includes an upstanding flange or lug, 24, which is located at substantially right angles to the shackle-engaging flange, 21, and is formed as a continuation thereof. The upstanding lug, 24, of the locking pawl is adapted to cooperate with notches formed in the periphery of a plurality of tumblers arranged in axial relation on the stud, 16, for controlling the locking of the releasable end of the shackle, 17.

The tumbler mechanism for controlling relative positions of the locking pawl includes a driving tumbler or disc, 26, disposed on the under side of the cover, 12, and rigidly associated with an externally accessible operating knob, 27, which is journaled in said cover, 12; a bottom tumbler, 28, and an intermediate tumbler, 29, all of which are arranged concentrically about the stud, 16, and provided with inter-engaging driving lugs, 26a, 28a and 29a, respectively, by means of which one tumbler may be adjusted by the other so as to position them in some predetermined arrangement or combination, as is well understood in the art. To prevent direct frictional contact between the tumbler discs, they are preferably separated by spacing elements, 30, herein shown as of horseshoe shape, for supporting the peripheral edges of said tumbler discs, and are anchored against transaxial shifting by a pair of transversely spaced upstanding studs, 32, on the mounting plate, which register with correspondingly spaced apertures, 33, in said spacing elements. A coil spring, 34, circumscribes the base portion of the stud, 16, and is interposed between the mounting plate, 15, and the bottom tumbler for yieldingly maintaining said tumblers in operative relation for insuring engagement of their respective driving lugs.

Figure 1:
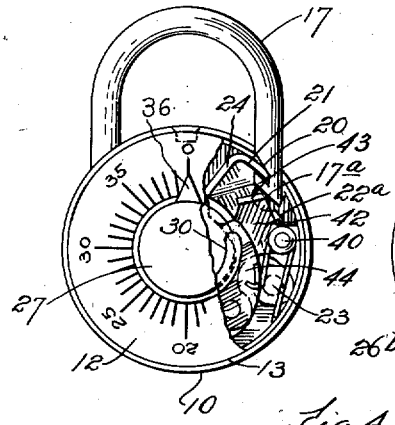
Figure 1 is a face view of a padlock embodying the present invention, having portions broken away to illustrate details of construction.

The outer surface of the cover, 12, is provided with the usual graduations, as seen in Figure 1, with which is adapted to be registered a pointer or indicating element, 36, rigidly associated with the knob, 27, and by means of which the tumblers may be set in a predetermined arrangement. The tumblers are provided with peripheral notches, 26$^b$, 28$^b$ and 29$^b$, for receiving the upstanding flange, 24, of the locking pawl so as to permit the flange, 21, to be moved out of operative engagement with the notch, 20, of the releasable end of the shackle.

Figure 2:
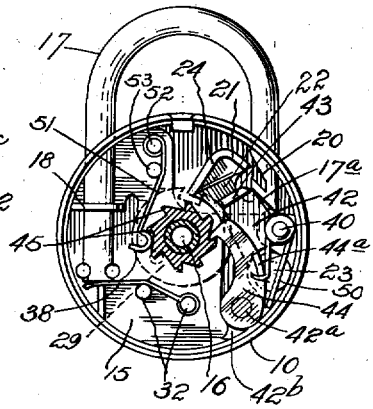
Figure 2 is a sectional view through the lock, with parts removed and the releasable end of the shackle depressed for shifting the locking pawl out of engagement therewith, to permit release of said end of the shackle from the casing.

A flat spring, 38, is anchored on one of the upstanding studs, 32, and engages against the other with its extreme end portion positioned to be engaged by the confined end of the shackle, 17, so that in locking relation the shackle is yieldingly urged in an outward direction, as may be seen in Figure 2 of the drawing. Immediately upon the setting of the tumbler elements in combination the shackle is pressed inward lightly so that the inclined cam surface, 17$^a$, of the extreme end portion of the releasable leg of the shackle engages an inclined cam surface, 22$^a$, of the locking pawl, thereby swinging the pawl about its pivot, 23, and shifting the locking flange, 21, out of operative engagement with the notch, 20, of the releasable leg of the shackle, which movement shifts the tumbler cooperating flange, 24, of the locking pawl into registration with the aligned peripheral notches in the tumblers, and upon release of the pressure on the shackle the spring, 38, shifts said shackle outwardly, permitting the releasable end thereof to be withdrawn clear out of the casing.

The lock thus far described is substantially the same in structure, and functions in precisely the same manner as that disclosed in Winning et al. Patent No. 1,736,183, issued November 19, 1929.

Figure 4:
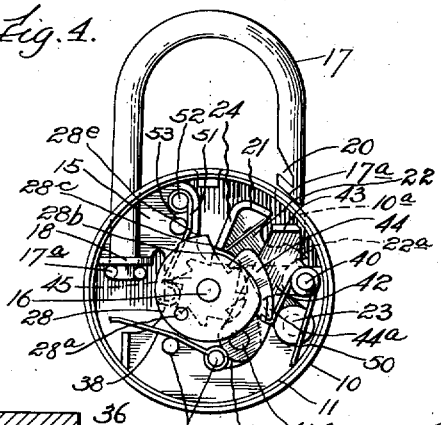
Figure 4 is a sectional view somewhat similar to Figure 2, showing the end of the shackle released from and disposed out of the casing, taken as indicated at line, 4—4, on Figure 3.
Figure 9:
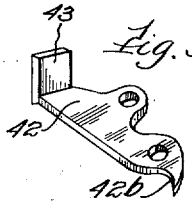
Figure 9 is a perspective view of the lever.

Pivotally mounted at 40 on the mounting plate, 15, adjacent the pivot, 23, of the locking pawl, is a lever, 42, which is provided with an upstanding lug, 43, at its upper end, which lug is adapted to be disposed in the path of reciprocatory movement of the releasable end of the shackle and engaged thereby when the same is entered into the lock casing. Said lug, 43, is preferably dimensioned and arranged to substantially close the opening, 10$^a$, in the wall of the lock casing (through which the releasable end of the shackle enters) when said end of the shackle is out of the casing, as seen in Figure 4 of the drawing. This precludes direct access to the tumblers and thus prevents "picking" and avoids ascertainment of the combination of the lock when the shackle is out of locking position. Pivotally mounted at 42$^a$, at the opposite end of the lever, 42, is a ratchet pawl, 44, which is adapted to cooperate with a ratchet, 45, rigidly associated with the bottom tumbler, 28. A spring, 50, is anchored on the pivot, 40, of the lever and reacts against the wall of the casing, 10, and an upstanding lug, 44$^a$, on the ratchet pawl, thereby normally tending to swing the lever and the ratchet pawl about the pivot, 40, so as to insure maintaining the ratchet pawl in operative relation with the ratchet, 45, while at the same time urging the lever in the direction for positioning its upstanding lug, 43, adjacent the aperture, 10$^a$, in the lock casing through which the releasable end of the shackle enters. The end of the lever opposite lug, 43, is formed with a curved hook end, 42$^b$, which is adapted to engage the adjacent stud, 32, as seen in Figure 4 for limiting the movement of said lever and insuring spacing lug, 43, in a position to be acted upon by the cam end, 17$^a$, of the releasable end of the shackle.

When the tumbler discs are set in combination, and the flange, 24, of the locking pawl is moved into the registered notches of the tumbler discs, the flange, 21, of said locking pawl is disposed out of the notch, 20, of the shackle, and the shackle is free to be shifted for withdrawing the releasable leg from the casing, as shown in Figure 4. In locking the lock the releasable leg of the shackle is entered into the casing, and its oblique end, 17$^a$, will be caused to act cam-wise against the upstanding lug, 43, of the lever, 42, and cause said lever to swing about its pivot, 40, which movement carries the ratchet pawl, 44, downwardly, thereby rotating the ratchet, 45, on the stud, 16, and in turning partially rotates the bottom tumbler. The bottom tumbler preferably has the edge, 28$^c$, of the notch, 28$^a$, formed slightly oblique, forming in effect a cam surface so that as said bottom tumbler is forced to rotate by the movement of the ratchet pawl, this surface, 28$^c$, acts cam-wise against the edge of the lug, 24, thereby forcibly shifting the locking pawl, 22, outwardly about its pivot, 23, and bringing the locking flange, 21, into operative engagement with the oblique notch, 20, of the releasable end of the shackle, and thereby positively locking the shackle in the casing. By virtue of the positive rotative movement of the bottom tumbler, 28, in shifting the locking pawl, 22, into locking engagement with the shackle, as above described, said bottom tumbler becomes displaced out of its registered position, and thus prevents releasing movement of the shackle until the tumbler discs have been readjusted with their notches in alignment.

The notch, 28$^b$, of the bottom tumbler is of substantial angular extent, and is gradually curved to approach the outer edge thereof, as may be seen in Figure 4, so as not to be affected by a slight advance motion of the parts preparatory to releasing the locking pawl from locking engagement with the releasable end of the shackle. It will now be manifest that after the tumblers have been set in combination, there will be some slight movement of the lever, 42, caused by the slight movement of the shackle which in turn is due to the engagement of the cam surface, 17$^a$, of the end of the shackle with the cam surface, 22$^a$, of the locking pawl, which engagement causes the latter to be swung about its pivot, carrying flange, 24, into the notches of the tumblers and moving flange, 21, clear of the operative engagement with the releasable end of the shackle. This movement of the elements imparts slight motion to the ratchet pawl, resulting in a slight partial rotation of the bottom tumbler.

It may be understood that the bottom tumbler need only be provided with a single stop shoulder for co-acting with the ratchet pawl, which must be properly located relative to the notch, 28$^b$, for receiving the upstanding lug, 24, of the locking pawl, and its driving lug, 28$^a$. However, to simplify the construction and to permit locating the notch at a plurality of angularly related positions relative to its driving lug, 28$^a$, (which permits various numerical combinations), we employ a ratchet, 45, having a plurality of teeth.

A spring, 51, is anchored on an upstanding stud, 52, and engages stud, 53, on the mounting plate, and is arranged for engagement with the ratchet, 45, for preventing accidental rotation of said ratchet and the bottom tumbler, each time the ratchet pawl, 44, moves in the up-stroke or camming over the ratchet teeth.

Figure 5:
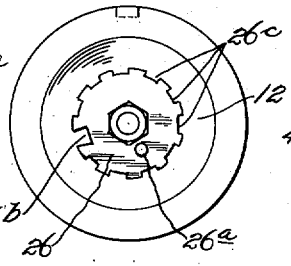
Figure 5 is a detail view of the under side of the cover plate and top tumbler.

The driving tumbler, 26, as indicated in Figure 5, is slightly larger in diameter than the other two tumblers and is provided with a series of relatively shallow peripheral notches, 26c, which are of substantially the same depth and width; the bottom of the notches being approximately aligned with the outer edge of the intermediate tumbler and the major portion of the bottom tumbler. These notches, 26c, are merely to mislead and prevent unauthorized ascertainment of one or more numerals of the lock combination by applying pressure on the shackle and forcing the flange, 24, of the locking pawl up against the periphery of the tumblers. Each time that a false notch, 26c, registers with the flange or lug 24, the slight movement permitted the locking pawl will shift the flange into the false notch and thus preventing turning of the knob, 27, and possible ascertainment of the effective notch, 26b, formed for receiving the flange, 24. And to further guard against accidental ascertainment of the combination this notch, 26b, of the driving tumbler is preferably formed of substantially the same width as the false notches, 26c, so that the spacing between notches will be the same, preventing ascertaining which notch is of full depth for receiving the flange, 24.

The bottom tumbler is provided with a comb or lug, 28e, which extends slightly beyond the normal periphery thereof and is located adjacent to the cam surface, 28c, and serves to support or maintain the flange, 24, of locking pawl, 22, clear of the notches, 26c, of the driving tumbler, immediately after said bottom tumbler has forcibly moved the locking pawl out of operative engagement with the notches, and into locking engagement with the releasable end of the shackle. Thus the false notches will not be effective until the tumblers have been so adjusted and manipulated that this comb portion, 28e, is shifted out of contact with the edge of the cooperating flange or lug, 24, of the locking pawl.

We claim:

1. In a permutation lock, a lock casing, a shackle mounted in the casing having one end adapted to be released from engagement therein, a locking pawl mounted in the casing and engageable with said releasable end of the shackle, tumbler mechanism including a series of disks adapted to be adjusted in a predetermined combination which permits said pawl to release the end of the shackle, and means engageable by the end of the shackle as it re-enters the casing for positively disarranging the tumbler disks.

2. In a permutation lock, a lock casing, a shackle mounted in the casing, having one end adapted to be released from engagement in the casing, a locking pawl mounted in said casing and engageable with said releasable end of the shackle, tumbler mechanism adapted to be adjusted in a predetermined combination, which permits said pawl to release the end of the shackle, and means actuated by said end of the shackle as it re-enters the casing for automatically upsetting the tumbler combination, by rotation of one of said tumblers relative to the others, the movement of said tumbler automatically moving the pawl into locking engagement with the said releasable end of the shackle.

3. In a permutation lock, a lock casing, a shackle mounted in the casing, having one end adapted to be released from engagement in the casing, a locking pawl mounted in said casing and engageable with said releasable end of the shackle, tumbler mechanism adapted to be adjusted in a predetermined combination, which permits said pawl to release the end of the shackle, and means actuated by said end of the shackle as it re-enters the casing for rotating one of the tumblers in one direction out of said predetermined combination, said movement of the tumbler automatically shifting the pawl into locking engagement with said releasable end of the shackle, said means also being arranged for preventing rotation of said tumbler in opposite direction.

4. In a permutation lock, a lock casing, a shackle mounted in the casing, having one end adapted to be released from engagement therein, for permitting a limited range of outward movement, a locking pawl pivotally mounted in the casing and engageable with said releasable end of the shackle, tumbler mechanism adapted to be adjusted in a predetermined combination to permit the pawl to release said end of the shackle, a pivotally mounted lever in the casing, said lever and said releasable end of the shackle having cooperating surfaces engageable when said end of the shackle re-enters the casing, for swinging said lever about its pivot, and means responsive to such movement of the lever for causing upsetting of the tumbler combination, and thereby forcibly shifting the pawl into locking engagement with said end of the shackle.

5. In the construction defined in claim 4, one of said cooperating surfaces of the lever and end of the shackle being formed obliquely to the path of movement of said releasable end of the shackle, so as to act camwise to swing the lever about its pivot.

6. In the construction defined in claim 4, the cooperating surface of said lever being adapted to be positioned in the path of movement of said end of the shackle, and dimensioned and arranged to substantially close the aperture in the casing through which said releasable end of the shackle enters.

7. In the construction defined in claim 4, means for yieldingly urging said lever into position for engagement by the end of the shackle as it enters the casing.

8. In a permutation lock, a lock casing, a shackle mounted in the casing, having one end adapted to be released from engagement therein, for permitting a limited range of outward movement, a locking pawl pivotally mounted in the casing and engageable with said releasable end of the shackle, tumbler mechanism adapted to be adjusted in a predetermined combination to permit the pawl to release said end of the shackle, a pivotally mounted lever in the casing, having its pivot located laterally offset with respect to the normal path of movement of said shackle end, the lever and releasable end of the shackle having cooperating surfaces engageable when said end of the shackle is entered into the casing for swinging the lever about its pivot, and means actuated in response to such movement of the lever for moving one of the tumblers out of combination, said movement of the tumbler being arranged for positively swinging the pawl into locking engagement with the releasable end of the shackle.

9. In a permutation lock, a lock casing, a shackle mounted in the casing, having one end adapted to be released from engagement therein, a locking pawl pivoted in the casing and engageable with said releasable end of the shackle, tumbler mechanism adapted to be adjusted in a predetermined arrangement for permitting the pawl to release the shackle, a lever pivoted in the casing and adapted to be engaged by said end of the shackle as it enters the casing for swinging it about its pivot, and a ratchet pawl engageable with a stop surface on one of the tumblers and operable in response to such swinging movement of the lever for rotating said tumbler a part of a revolution out of said predetermined arrangement, said tumbler having means for forcibly moving the locking pawl into locking engagement with said end of the shackle in response to said partial rotation.

10. In a permutation lock, a lock casing, a shackle mounted in the casing and having one end adapted to be released from engagement therein, a locking pawl pivoted in the casing and engageable with said releasable end of the shackle, tumbler mechanism adapted to be adjusted in a predetermined arrangement for permitting the pawl to release the shackle, a lever pivoted in the casing and having one end adapted to be engaged by said end of the shackle as it enters the casing for swinging it about its pivot, and a ratchet pawl pivotally connected to the other end of the lever and arranged to engage a stop surface on one of the tumblers for rotating the same out of registration with the other tumblers by the movement of the lever, the tumbler being provided with means to positively move the locking pawl into operative locking engagement with the end of the shackle during such movement of said tumbler.

11. In the construction defined in claim 10, said stop surface being a tooth of a ratchet rigidly associated with said actuated tumbler.

12. In a permutation lock, a lock casing, a shackle mounted in the casing and having one end adapted to be released from engagement therein, a locking pawl pivoted in the casing and engageable with said releasable end of the shackle, tumbler mechanism adapted to be adjusted in a predetermined arrangement for permitting the pawl to release the shackle, a lever pivoted in the casing and having one end adapted to be engaged by said end of the shackle as it enters the casing for swinging it about its pivot, a ratchet pawl pivotally connected to the other end of the lever, a toothed ratchet rigidly associated with the under side of the bottom-most tumbler and engageable by said ratchet pawl, for rotating said bottom tumbler out of combination in response to said swinging movement of the lever, the bottom tumbler having means for forcibly shifting the locking pawl into locking engagement with the end of the shackle during said rotative movement of said tumbler, and spring means engageable with said ratchet for yieldingly holding the same and the bottom tumbler against rotation in the opposite direction.

13. In the construction defined in claim 10, spring means for urging the ratchet pawl into position for operative engagement with said stop surface.

14. In the construction defined in claim 10, spring means reacting between the casing and the ratchet pawl for urging the latter into operative engagement with its cooperating stop surface, and by virtue of said pivotal connection of the ratchet pawl to the lever, said spring also serves to urge the upper end of the lever into position for encounter by the end of the shackle.

15. In a permutation lock, a lock casing, a shackle mounted in the casing and having one end adapted to be released from engagement therein, a locking pawl pivoted in the casing and engageable with said releasable end of the shackle, tumbler mechanism including a plurality of tumbler disks each having a peripheral notch adapted to be registered to permit entry of a cooperating part of said pawl to release the shackle, a lever pivoted in the casing and adapted to be engaged by said end of the shackle as it re-enters the casing for swinging said lever about its pivot, and a ratchet pawl engageable with a stop surface of the bottom tumbler and operable in response to such swinging of the lever for causing partial rotation of said tumbler, said notch of the bottom tumbler having an edge adapted to engage camwise with said cooperating part of the locking pawl for shifting said pawl into locking engagement with the releasable end of the shackle.

16. In the construction defined in claim 15, the notch in said bottom tumbler being of substantial angular extent, permitting accommodation of the cooperating part of the locking pawl, to compensate for slight partial rotation of said tumbler by the ratchet pawl due to the movement of said lever caused by its engagement with the end of the shackle, when slight pressure is applied thereto, for causing its release from the locking pawl.

17. In the construction defined in claim 15, said bottom tumbler having a comb adjacent the cam edge of the notch, of a diameter slightly in excess of the diameter of the other tumblers to insure movement of the locking pawl into operative engagement with the end of the shackle and for supporting the same clear of contact with the peripheral edges of the other tumblers.

18. In a permutation lock, in combination with a shackle, a locking pawl, and a notched permutation disk, motion-transmitting connections acting directly upon said disk in a direction to disengage the locking pawl therefrom, said connections including a member disposed in the path of movement of a portion of the shackle to receive motion from it.

19. In a permutation lock, in combination with a notched shackle, a permutation disk having a toothed surface and a locking pawl alternatively engageable with the permutation disk or shackle, a ratchet pawl positioned to interact with said toothed surface of the disk, and motion-multiplying connections for the actuation of said ratchet pawl, including a part disposed in the path of movement of a portion of the shackle, for positively shifting said locking pawl out of engagement with the disk and into operative engagement with the notched shackle.

20. In a permutation lock including a lock casing, a shackle mounted in the casing having one end adapted to be released from engagement therein, a locking pawl pivotally mounted in the casing and engageable with said releasable end of the shackle, tumbler mechanism adapted to be adjusted in a predetermined arrangement for permitting said pawl to be shifted out of engagement with the end of the shackle, and means independent of said pawl adapted to be directly engaged and actuated by said end of the shackle as it re-enters the casing for swinging the pawl about its pivot into locking engagement with said releasable end of the shackle.

21. In a permutation lock, in combination with a shackle and a locking pawl, means for utilizing an entering shackle movement for causing the locking pawl to be shifted into locking engagement with the shackle, said means comprising a notched permutation disk, a ratchet pawl engageable therewith, and motion-multiplying connections operatively connected with the ratchet pawl and including a member disposed in the path of entry of and engageable by a portion of said shackle as it enters the casing, for causing rotation of said permutation disk.

22. In a permutation padlock, a casing, a shackle mounted in the casing having one end adapted to be released from engagement therein, a locking pawl mounted in the casing and engageable with said releasable end of the shackle, tumbler mechanism arranged for normally maintaining said pawl in locking engagement with said end of the shackle, said mechanism including a series of disks each having a peripheral notch adapted to be adjusted in registration for receiving an inter-engaging element of said pawl and thereby permit moving the pawl out of locking engagement with said end of the shackle, and means including a part adapted to be engaged and actuated by the releasable end of the shackle as it re-enters the casing for shifting said inter-engaging feature of the pawl out of the notches of the tumblers, which movement shifts the pawl into locking engagement with the releasable end of the shackle and simultaneously disarranges the tumbler disks.

23. In a permutation lock, a lock casing, a shackle mounted in the casing having one end adapted to be released from engagement therein, a locking pawl mounted in the casing and engageable with said releasable end of the shackle, tumbler mechanism including a series of disks adapted to be adjusted in a predetermined combination which permits said pawl to release the end of the shackle, and means directly engageable by of the shackle when it is moved in locking direction for positively engaging and disarranging one of said tumbler disks.

RAYMOND J. BUETTNER.
ROBERT A. FOUND.
JOSEPH M. MUNTNER.
JOHN J. NEITZ.
FRANK C. ZANZIG.